United States Patent
Zhao et al.

(10) Patent No.: US 7,419,088 B2
(45) Date of Patent: Sep. 2, 2008

(54) BANKNOTE SERIAL NUMBER PROCESSING METHOD AND ITS DEVICE

(76) Inventors: Rui Zhao, 247 Huigong Street, Shenhe District, Shenyang, Liaoning Province (CN) 110013; Yanzai Gu, 247 Huigong Street, Shenhe District, Shenyang, Liaoning Province (CN) 110013

(*) Notice: Subject to any disclaimer, the term of this patent is extended or adjusted under 35 U.S.C. 154(b) by 164 days.

(21) Appl. No.: 10/554,819

(22) PCT Filed: Apr. 22, 2004

(86) PCT No.: PCT/CN2004/000385

§ 371 (c)(1),
(2), (4) Date: Oct. 28, 2005

(87) PCT Pub. No.: WO2004/097718

PCT Pub. Date: Nov. 11, 2004

(65) Prior Publication Data

US 2007/0040014 A1 Feb. 22, 2007

(30) Foreign Application Priority Data

Apr. 29, 2003 (CN) ................ 03 1 11588

(51) Int. Cl.
*G07F 19/00* (2006.01)
(52) U.S. Cl. .............. 235/379; 235/454; 235/462.01; 235/462.14; 705/42
(58) Field of Classification Search ......... 235/379, 235/462.01, 462.24, 462.41, 454; 705/42, 705/45
See application file for complete search history.

(56) References Cited

U.S. PATENT DOCUMENTS 6,363,164 B1 * 3/2002 Jones et al. ............. 382/135

(Continued)

FOREIGN PATENT DOCUMENTS

CN 1204816 C 1/1999

(Continued)

OTHER PUBLICATIONS

PCT International Preliminary Examination Report for PCT/CN2004/00385 with English translation (PCT/IPEA/409, PCT/IPEA/416) dated Apr. 2005.

*Primary Examiner*—Seung H Lee
(74) *Attorney, Agent, or Firm*—Smith, Gambrell & Russell, LLP

(57) ABSTRACT

Banknote serial number processing method and apparatus having a serial number recording step where images of serial numbers associated with to-be-newly recorded banknotes are subjected to image recognition. Image recognition is followed by a conversion step involving a conversion of the image recognized serial numbers to digital data inclusive of digital serial number data and bundle codes. There is also a comparison step which includes a comparing of digital data produced in the conversion step with read-in or provided serial number data, with the provided serial number data being derived from a database containing serial number data of non-counterfeit banknotes which represent banknotes unlawfully obtained by a third party. Comparison hits trigger an alarm and/or forwarding of information, while non-comparison hit banknotes are forwarded to memory with associated bundle coding.

26 Claims, 6 Drawing Sheets

U.S. PATENT DOCUMENTS

| | | | |
|---|---|---|---|
| 6,381,354 B1* | 4/2002 | Mennie et al. | 382/135 |
| 6,394,256 B2* | 5/2002 | Mukai | 194/207 |
| 6,550,671 B1* | 4/2003 | Brown et al. | 235/379 |
| 7,200,255 B2* | 4/2007 | Jones et al. | 382/135 |
| 2003/0236589 A1* | 12/2003 | Myatt | 700/223 |
| 2005/0183928 A1* | 8/2005 | Jones et al. | 194/207 |
| 2006/0010071 A1* | 1/2006 | Jones et al. | 705/42 |
| 2006/0054454 A1* | 3/2006 | Oh | 194/207 |
| 2007/0112674 A1* | 5/2007 | Jones | 705/45 |

FOREIGN PATENT DOCUMENTS

| | | |
|---|---|---|
| CN | 2507074 Y | 8/2002 |
| CN | 1542691 A | 4/2003 |

* cited by examiner

BANKNOTE SERIAL NUMBER PROCESSING METHOD AND ITS DEVICE

FIELD OF THE INVENTION

This invention is relates to banknote counting, specifically to the banknote serial number processing method and its device.

BACKGROUND OF THE INVENTION

Violent crime such as robbery of bank and cash convey vehicle, although occurring at low rate, causes physical and psychological traumas to the victims involved and result in social hazards, due to their severe violation and danger. Kidnapping and extortion are other type of crime, i.e. extorting gigantic amount of money by imposing threats upon the lives of the hostage. To prevent such crimes the Nation has taken measures of many kinds, such as social security integrated controls, strengthening of police force and equipping special cash transport vehicles, etc. However, these measures only increase criminals' difficulties in committing crimes, while the these types of problems are far from being rooted out and preventions are not erected. The ultimate objective of violent crimes of bank robbery, cash vehicle robbery or kidnapping is to obtain a huge amount of banknote, usually more than tens of thousands, even millions of dollars, where the money the criminals robbed is in bundles. Counterfeit money detectors and banknote counting devices with fake banknote detection function in prior art can identify the counterfeit notes, but they can do nothings about the bundled genuine cash robbed.

SUMMARY OF THE INVENTION

To facilitate the investigation of bundled cash robbery, it is an object of the present invention to provide the banknote serial number processing method and its device for identification of the banknote serial number and their applications will bring about the banks' security protection.

The technical programs of this invention include:
1) Banknote serial number recording step, that is to convert the banknote serial number into image signal by using image capture device;
2) Banknote serial number recording decoded step, i.e. process the banknote serial number image signal by filtration, analogue-digital conversion and synchronizing separation and store images signal in image memory unit;
3) Banknote serial number digital signal processing step, which is used for the stored image recognition processing, identifying the bundle's code and storing the banknote serial number and bundle code in digital memory unit and outputting for later use;
4) Reading step for banknote serial number to be compared, that is to sort out corresponding banknote serial number from the bundle code to be compared, then store the serial number in reading-in memory unit;
5) Comparison step for the banknote serial number to be compared and newly entered banknote serial number comparison, which will compare the newly entered serial number with each of the said serial number from the reading-in memory until same serial number coincides and an alarm sounds.

Wherein the newly entered banknote serial number can be acquired in the same steps (steps 1 to 3 above); the code number in a certain bundle may be printed on a label attaching to that bundle or barcodes tagged to the bundle.

The specific device under this invention includes image capture unit mounted upon banknote Counting device, in correspondence with a position of the banknote serial number; also the invention includes banknote serial number recording and comparison unit. It consists of video decoder, image memory unit, digital signal processing unit and digit memory unit. The video decoder input signals are image signals collected from the image capture device and sending its output signal to the image memory unit, and then the digital signal processor receives the image memory unit's output signals that carries out digital recognition processing and outputs the processed data as banknote serial number and bundle codes in digital memory unit, then outputs them via an output device.

The digital signal processing unit has recording and comparison programs; the recording program's flow procedure is as follows: starting, formatting, setting the cash note number as zero; reading image from the image memory unit; judging if it is valid image, if not, ending the program; if it is valid image, Gauss filtration, modified projection location and digital mode mask processing are carried out, the serial numbers are rectified and converted to binary data, and then their structures are identified and output; add one to cash note number; judging if the cash note number is 100, if so, bundle up the banknote and assign a bundle's code to the bundle, output the bundle's code, reset the cash note number to zero and go back the above steps from the step of reading image from the image memory unit; if the cash note number is not 100, the system goes directly back to the step of reading image from the image memory unit.

The comparison program procedures are: starting, formatting, setting cash note number to zero; reading the image from the image memory unit; judging if the image is valid, if not, ending the program; if the image is valid, Gauss filtration, modified projection location and digital mode mask processing are carried out, the serial numbers are rectified and converted to binary data, and then their structures are identified and output and compared with the stored possible robbed banknote serial number, when same serial number(s) is found, signaling an alarm and ending the program; if there is no same serial number(s), adding one to cash note number; judging if the cash note number is 100, if so, bundling up the banknote and assigning a code to the bundle and output the bundle code; resetting cash note number as zero and going back the above steps from the step of reading image from the image memory unit; if the cash note number is not 100, returning directly to the step of reading image from the image memory unit; the image capture device can be scanners or video cameras aiming at the banknote serial number, one at each side; a number of the image capture device can be four, two at entry side of banknote counting device, the other two at outgoing side of banknote counting device; a number of the image capture device can be four, two above banknote counting device between entry side and outgoing side and the other two underneath the banknote counting device between entry side and outgoing side.

In the video decoder, the video-preprocessor unit is the key part. The video decoder is equipped with the second crystal oscillator with its input terminal connected with output of image capture device which sending out collected image signals. The second crystal oscillation circuit's output digital signals are sent to image memory unit; a monolithic computer is connected with video pre-processor that is used for formatting; the monolithic computer is equipped with the first resetting circuit and the first crystal oscillation circuit; the digital signal processing unit adopts DSP digital signal processor, and has built-in image preprocessing unit, binary processing unit, digital recognition unit, and installed with recording and comparison programs and the clock, the second resetting circuit, power source and simulation interface, and connected with digital memory unit through data bus and address bus; the digital memory unit comprises data memory, program memory; and they are connected with DSP respectively, output signal of the digital memory unit connected with output device; DSP digital signal processing unit is also equipped with alarming output device and digital comparison unit; output device may be a digital displayer or connected with computer through USB port.

This invention has the following advantages:

1. Since this invention can store banknote serial numbers and assign each bundle of money an unique code, the money robbed in the event of bank robbery, cash transport vehicle robbery or kidnapping can be published in terms of the banknote serial numbers and bundle codes by the banking authority to form threat to the criminals. The banknote serial numbers robbed may store in the memory of all banknote serial number processing device (counterfeit cash detector) that will conduct real time monitoring and send out report to police as a trace of the criminals if the robbed money comes into the market circulation and lost serial numbers can match the ones in the memory.
2. When terminals at the cashier detected the lost serial numbers going to be stored matching that in the memory, the system identifies the banknote serial numbers as counterfeit. Compared with current technologies, this invention is simpler and more accurate so that it will formulate more severe strikes to the crimes.

DESCRIPTION OF THE INVENTION IN DETAIL

Banknote serial number processing method, including:
1) Banknote serial number recording step, that is to convert the banknote serial number into image signal by using image capture device;
2) Banknote serial number recording decoded step, i.e. process the banknote serial number image signal by filtration, analogue-digital conversion and synchronizing separation and store images signal in image memory unit:
3) Banknote serial number digital signal processing step- carrying out recognition processing for the signal from image memory unit, defining the bundle's code and storing banknote serial number and bundle code in digital memory unit and Outputting for later use;
4) Reading step for banknote serial number to be compared, that is to obtain the corresponding banknote serial number from the bundle code to be compared, then store the serial number in the reading-in memory unit;
5) Comparison step for comparison banknote serial number and newly recording_banknote serial number, and that is to compare the newly recording serial number with each of the said serial number from the reading-in memory. If the banknote serial number numbers match the system, it will alarm.

Processing method for obtaining newly entered banknote serial number is the same as described in steps 1), 2) and 3).

Figure 1:
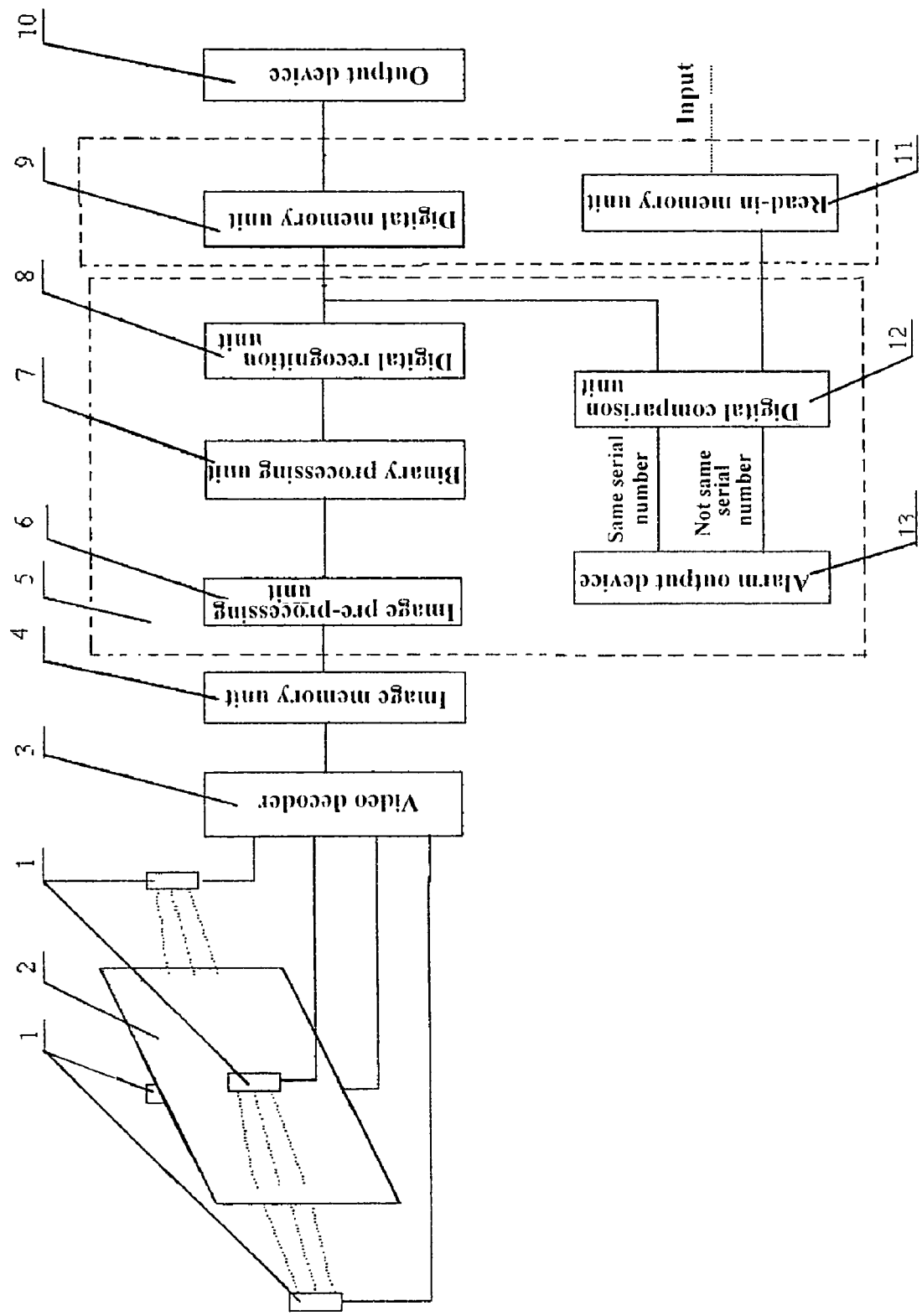
FIG. 1 is an electric circuit structure block chart of the invention.

The banknote serial number processing specific device: As shown in FIG. 1, the image capture unit 1 installed on the banknote counting device, setting of image capture unit 1 in correspondence with the position of banknote serial number 2; also including banknote serial number recording and comparison units that consists of video decoder 3, image memory unit 4, digital signal processing unit 5 and digital memory unit 9. The input signal of video decoder 3 is image signals captured by the image capture device its output is connected with image memory unit 4; image memory unit 4's output signals are processed (recognized) by digital signal processing unit 5 and outputting the banknote serial numbers and bundle codes to digital memory unit 9 for outputting in output device 10.

In this example, the image capture device (refer to FIG. 1) is used for reading-in banknote serial numbers information, an optical electronic scanner can be used. For the banknote already sorted in terms of their surface and back, left to right orientations, only one scanner is sufficient and installed to allow the lens facing banknote serial number area. Considering the specific number positions (e.g. 100 RBM has two serial numbers in two sides on the surface, one printed horizontally and another vertically), at least two scanners are needed, one on left and another on right side. Therefore, if the banknote facing orientation is in order, all banknote serial numbers can be scanned. If the banknote orientation is not sorted, the banknote(s) is needed to be turned over and the second time scanning is required.

To avoid missed scans as a result of neglect of operator who forgets to turn the banknote over after first scanning, four scanners may be installed upon the banknote counting device, two in a group. One group is installed on the banknote entry side; and another is mounted at the banknote outgoing side; Or one group above the banknote counting device between of entry side and outgoing side, and another group under the banknote counting device between of entry side and outgoing side.

Figure 2:
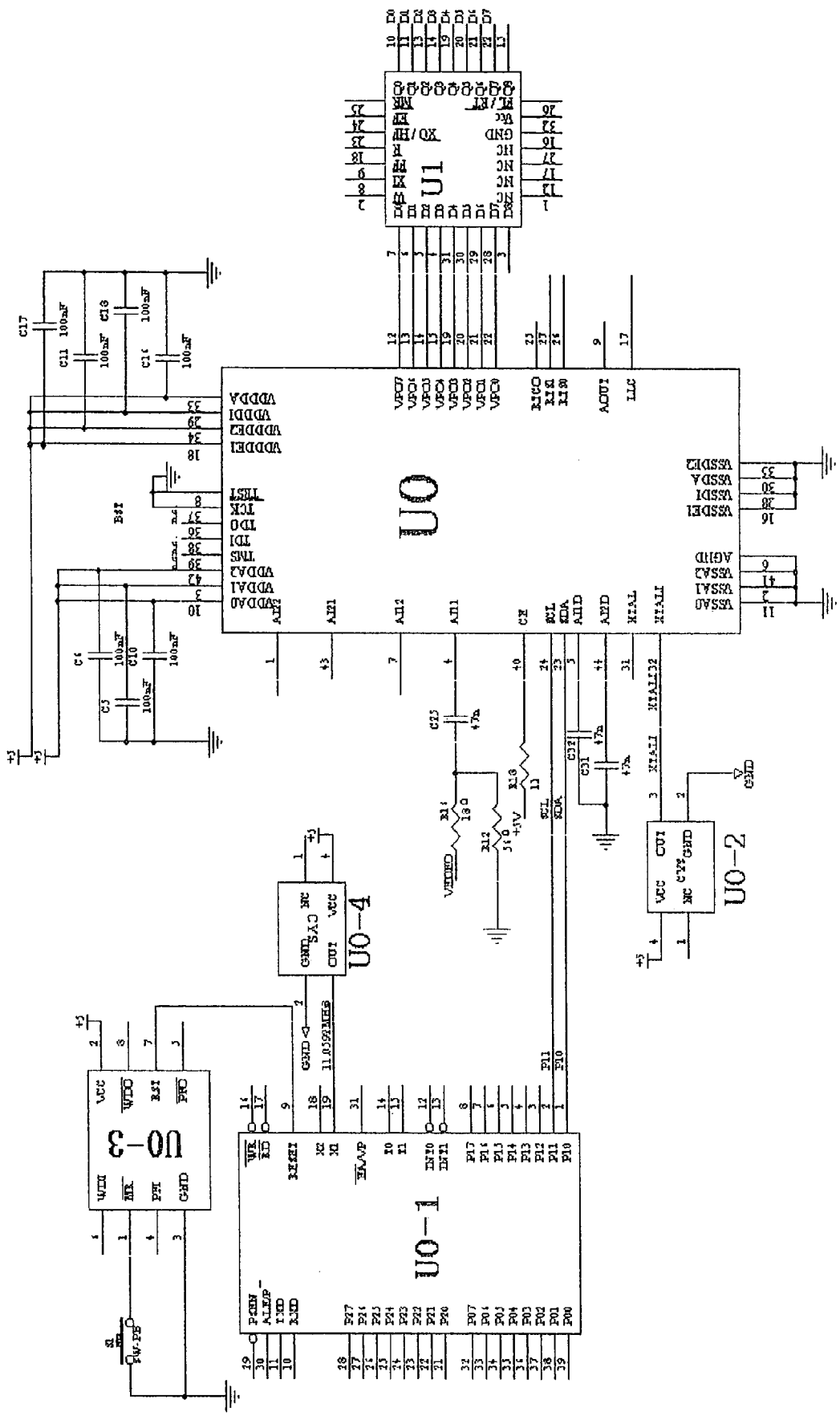
FIG. 2 is a circuits schematic diagram of the video decoder circuit and the image memory unit circuit in FIG. 1.

As shown in FIG. 2, video decoder 3 includes key part-video pre-processor U0. The video pre-processor is connected with the second crystal oscillator U0-2, its input terminal is connected with image capture device output terminal's collected image signals and its output digital image signals are transmitted to image memory unit 4; A monolithic computer U0-1 is connected with video pre-processor U0 for formatting; the monolithic computer U0-1 is equipped with the first resetting circuit U0-3, the first crystal oscillation circuit U0-4; A first-in-first-out memory U1 is the key part of the image memory unit 4 and its input terminal is connected with captured image signals through video decoding circuit, and its output signals are sent to digital signal processing unit 5.

Figure 3:
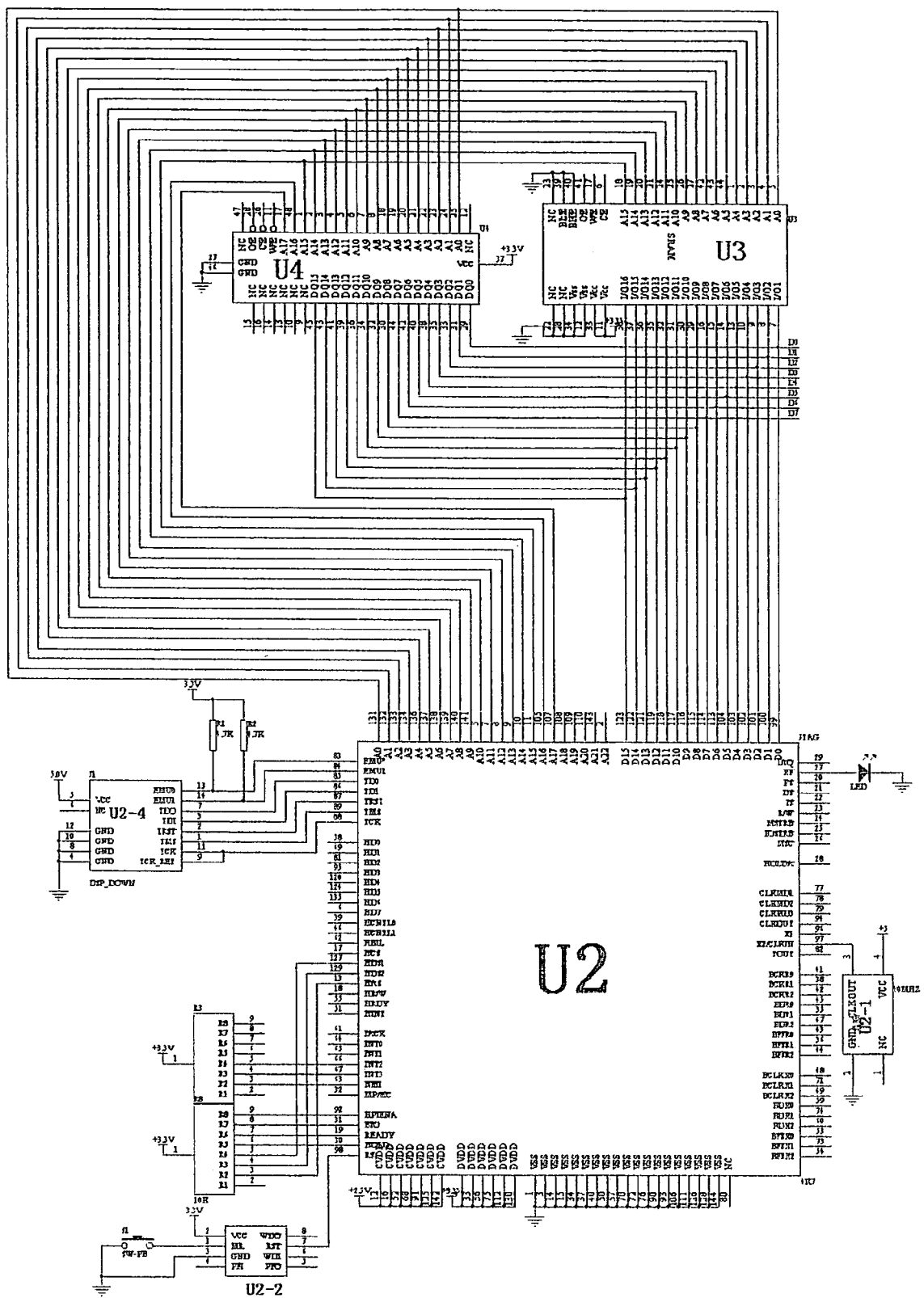
FIG. 3 is a circuits schematic diagram of the digital signal processing unit and the digital memory unit in FIG. 1.
Figure 5:
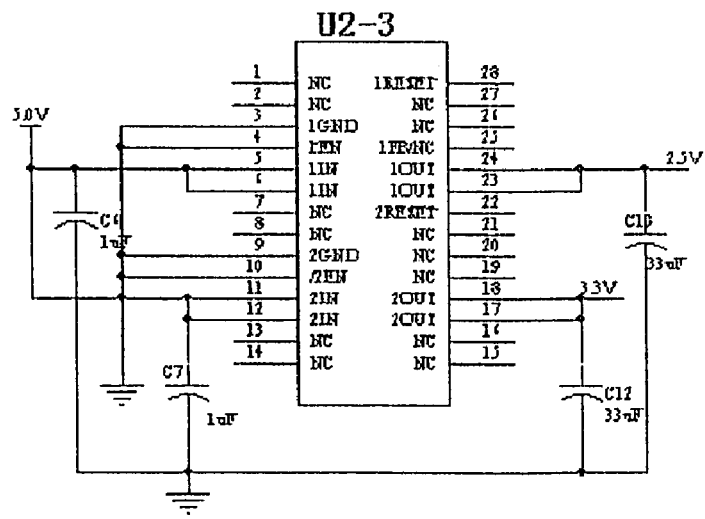
FIG. 5 is a circuits schematic diagram of the power resource of the digital signal processing unit in FIG. 3.

As shown in FIGS. 3 and 5, the digital signal processing unit 5 uses DSP digital signal processor U2, in which there are image pre-processing unit 6, binary processing unit 7, digital recognition unit 8 and recording and comparison programs and the clock U2-1, the second resetting circuit U2-2, power source U2-3 and simulation interface connected with digital memory unit 9 via data bus and address bus; XF connector of the DSP digital signal processor U2 is functioning the alarm output device 13 (in this example, a luminous diode is employed) and there is the digital comparison unit 12 as well.

Figure 4:
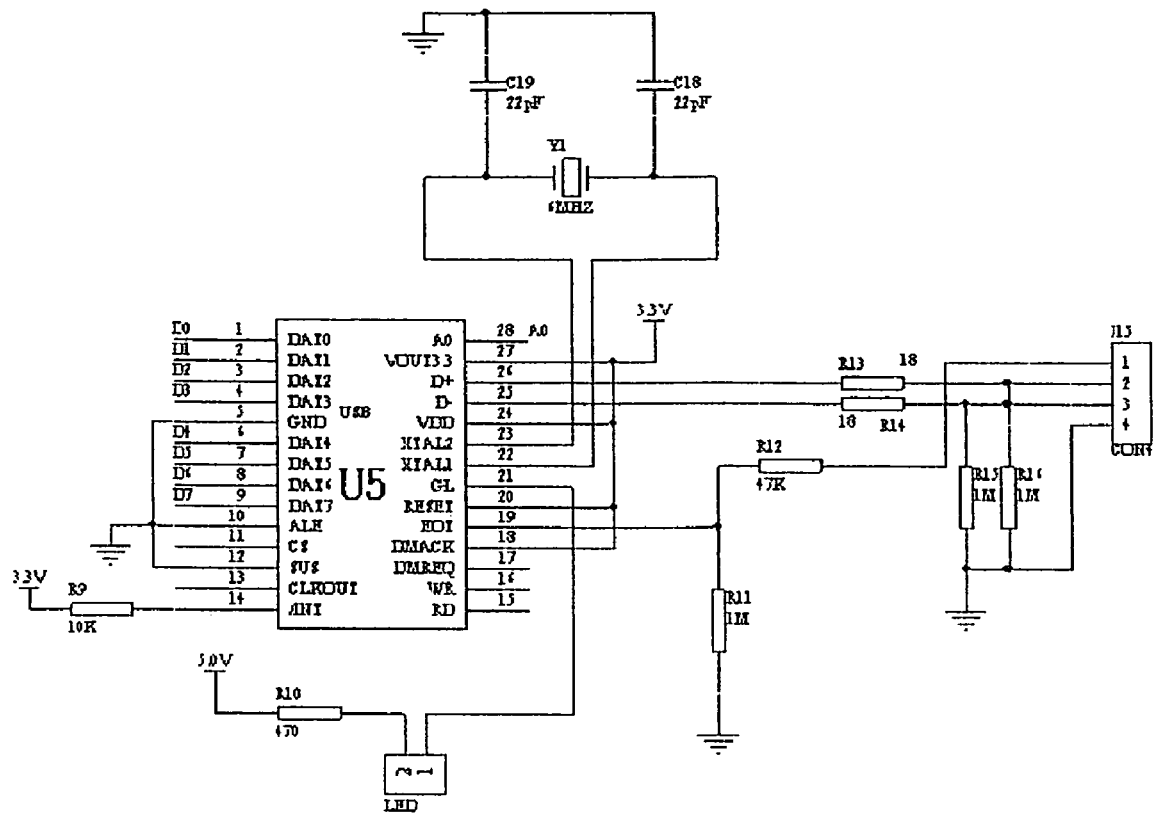
FIG. 4 is a circuits schematic diagram of the output device in FIG. 1.

As shown in FIGS. 3 and 4, the digital memory unit 9 consists of the digital memory U3 (RAM is utilized) and the program memory U4 (FLASH is used), which are connected with the DSP digital signal processor U2 respectively. The digital memory U3 is used for the intermediate result. The program memory U4 is used for memory of programs with its output connects the output device. The output unit 13 connects the computer through USB port U5 (it may also be the digital displayer).

The FIG. 1 is of the comparison program for identifying if the banknote are robbed (stored in the DSP digital signal processor U2): the program memory U4 is, at the same time, as the read-in memory unit 11 receiving data from the computer (stored bundle code corresponding to banknote serial numbers) and sending to the read-in memory unit 11. To compare with newly entered the banknote in the digital signal processing unit 5 (i.e. digital comparison unit 12) by the comparison program and to display or send out an alarm by alarming device 13 connected with the digital signal processing unit 5 when the numbers are matching.

Figure 6:
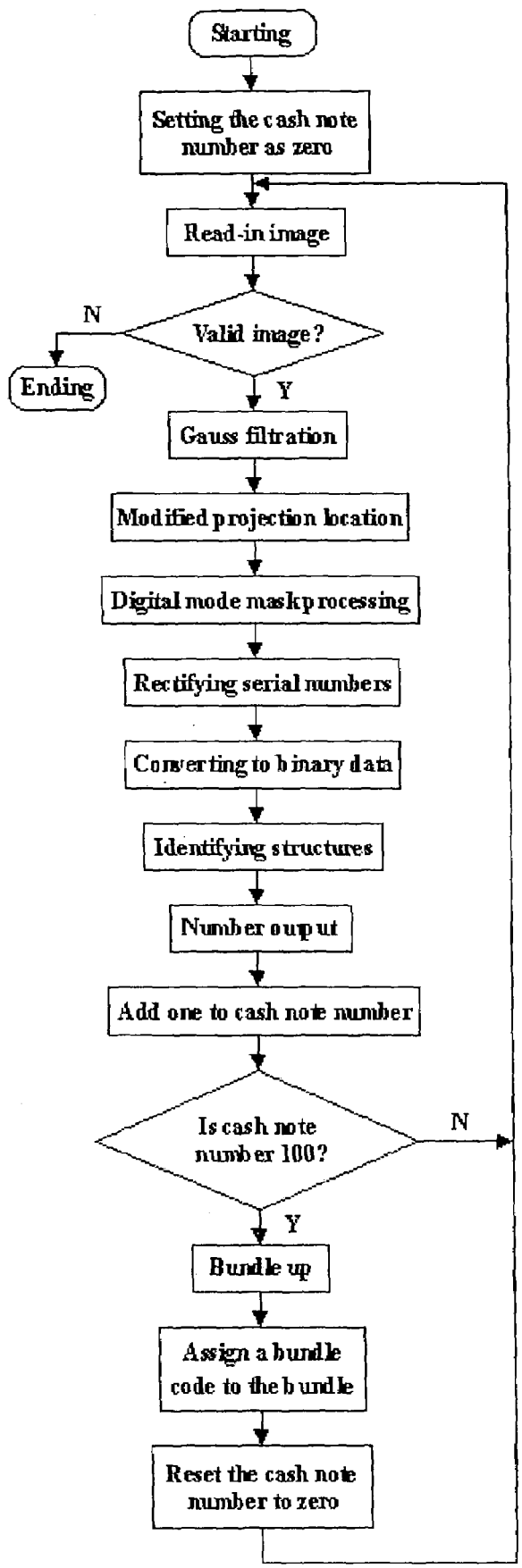
FIG. 6 is a flow chart of the recording program of the digital signal processing unit in FIG. 3.

As shown in FIG. 6, the recording program's procedures are as follows: starting, formatting, setting cash note number as zero; reading images from the image memory unit; identifying if it is valid image, if not, ending the program; if it is valid, Gauss filtration, modified projection location and digital mode mask processing are carried out, the serial numbers are rectified and converted to binary data, and then their structures are identified and output; add one to cash note number; identify if the cash note number is 100, if so, bundle up the banknote and assign a code to the bundle, output the bundle's code, reset the cash note number to zero and go back the above steps from the step of reading image from the image memory unit; if the cash note number is not 100, the system goes directly back to the step of reading image from the image memory unit.

Figure 7:
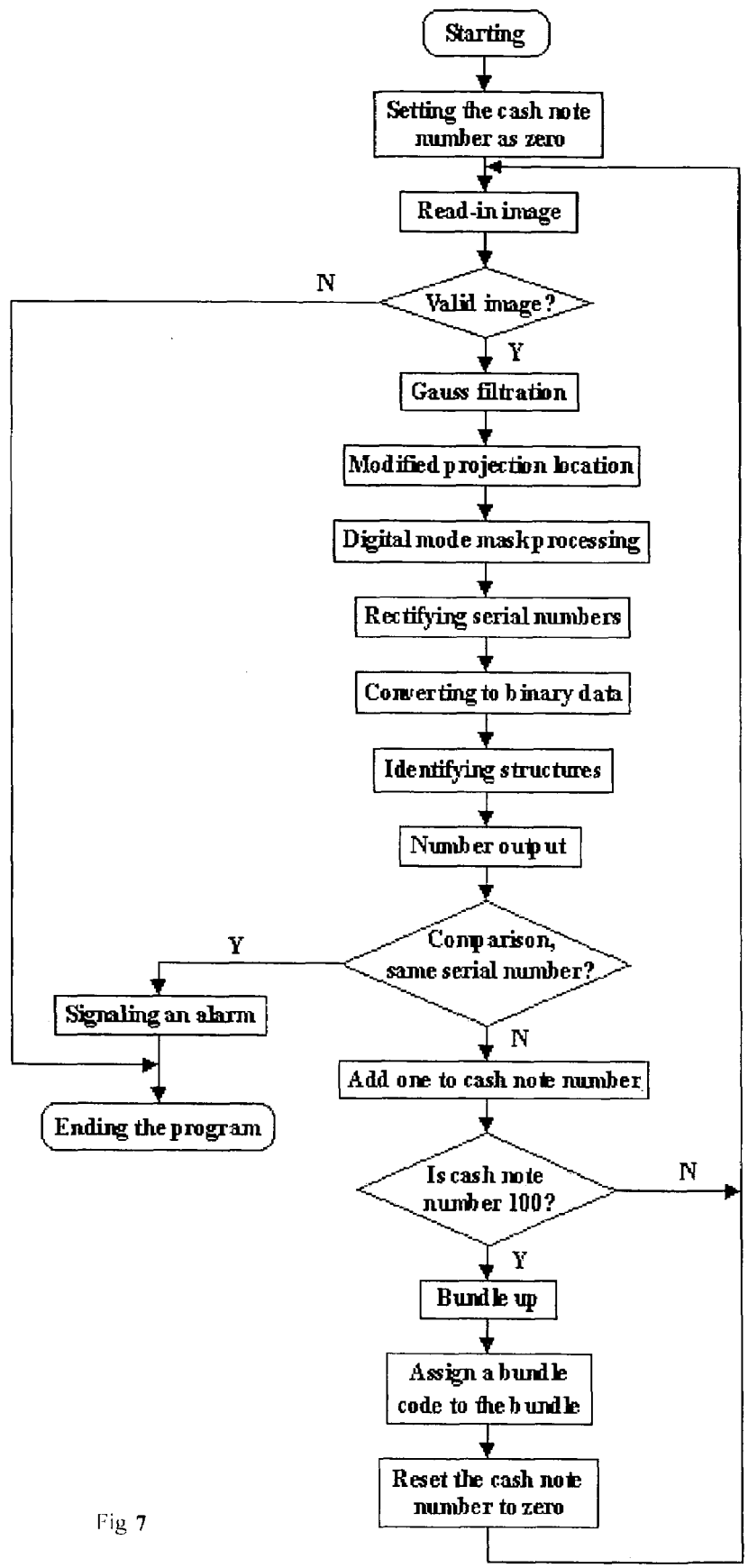
FIG. 7 is a flow chart of the comparison program of the digital signal processing unit in FIG. 3.

As shown in FIG. 7, the comparison program procedures are as follows: starting, formatting, setting cash note number to zero; reading the image from the image memory unit; identifying if the image is valid, if not, ending the program; if the image is valid, Gauss filtration, modified projection location and digital mode mask processing are used, the serial numbers are rectified and converted to binary data, and then their structures are identified and output and compared with the stored possible robbed banknote serial number, when same serial number(s) is found, signaling an alarm and ending the program; if there is no same serial number(s) is found, adding one to cash note number; judging if the cash note number is 100, if so, bundling up the banknote and assigning a code to the bundle and output the bundle code; resetting cash note number as zero and going back the above steps from the step of reading image from the image memory unit; if the cash note number is not 100, returning directly to the step of reading image from the image memory unit; the image sensor can be scanner or the video camera aiming at the banknote serial number, one at each side; a number of the image sensor can be four, two at entry side of banknote Counting device, the other two at cash outgoing side of banknote counting device; a number of the image sensor can be four, two above banknote counting device between entry side and Outgoing side and the other two underneath banknote counting device between entry side and outgoing side.

Principles of the Invention:

This invention adopts high speed digital signal processor U2 and the monolithic computer U0-1 double processor structure. The reason of this structure is that the digital signal processor U2 is calculation-intensive processor, while the monolithic computer U0-1 can realize controls in a simple way. This system collects and processes image data by using the digital signal processor U2, while circuit controls are assumed by the monolithic computer U0-1. The video input part allows video signals input into the video decoder circuit, where the input signals are formatted and converted into digital image signals by the monolithic computer U0-1, and in the meanwhile, these data, under the control of the separated synchronizing signals and timing signals, will be collected and stored in the image memory unit 4, and then sent those image data further to the computer via the USB interface U5. The digital signal processor U2 transfers the image data from its digital memory unit for identification, and then the results will be sent to the computer via the USB interface U5 for displaying (or displayed by digital display).

In this example, the video decoder 3's circuit is design for the purpose of accommodating the videoing of analogous image signal by a camera and handling anti-mixed over-lapped waves filtration, A/D conversion, synchronizing separation, etc, prior to calculation process. The video pre-processor in this example is 9 bit video input processor SAA7113F from Philips Company. It has 4 analogue signal input terminals (A111, A112, A121 and A122). In this example, A111 is used for analogue signal inputting, the collected analogue image signals provide the needed image data for video pre-processor U0; the oscillation frequency 24.576 MHz is adopted as required, outside the second crystal oscillator U0-2 functions as the clock. The video digital signals generated by the video pre-processor U0 are sent to DSP digital signal processor U2, via a 8 bit VPO port, and then the signals are further calculated and processed in DSP digital signal processor U2 and thus obtaining expected processing results.

In this example, the first-in-first-out memory U1 (i.e. FIFO) is used for memory of digitized image being as a image memory unit. Since the FIFO memory U1 doesn't need address signals, the image data processed by video pre-processor U0 can be quickly and successfully stored in the memory unit and the data are provided for data needed by the follow-up processing units.

The digital signal processing unit 5 is the core component of the whole system, accomplishing mainly the calculating and processing tasks for the digital data processed by video pre-processor U0, and generating expected output signals. Owing to the pursuit of real-time processing in design of this system, there is high degree of requirements for the calculation speed of processor. A fixed-point digital signal processor TMS320VC5410 from TI company is used, with its chip having modified multiple bus structure (including three independent 16 bit data memory buses and one built-in program memory bus), 40 bit arithmetic logic unit ALU with the function of sole instruction circulation and block circulating operations, 32 bit long operand instructions 100 MIPS (million instructions per second) and so on.

The design of the digital memory unit 9 (TMS320VC5410 is used): After processed digital video signals entry the DSP digital signal processor U2, a certain memory space are needed, as well as some intermediate results and the DSP digital signal processor U2's program need memories, while there is so limited memories in the DSP digital signal processor U2 that it can hardly satisfy those needs. Therefore, the extensions of the DSP digital signal processor U2's memory (the digital memory U3 and the program memory U4) are to be exercised. To meet the design requirement, the extension of the digital memory U3 is made by adding SRAM-CY7C1601; the extension of the program memory U4 uses FlashROM-SST39VF400A.

The DSP digital signal processor U2 uses sealed crystal oscillator enabling the direct inputs of external clock source into X2 and X1 for dangling. Its operation frequency is exerted through programmable PLL, while formatting software programmable PLL is controlled by a clock mode register (address 58H) of a memory mapping. CLKMD is used for defining PLL clock module configuration. The second resetting circuit U2-2 is used for system resetting, with MAX706PCPA applied. DSP digital signal processor U2 uses low voltage power supply, its core voltage and I/O voltage are separated. Its working voltage CVDD is 2.5 V; I/O pins working voltage DVDD is 3.3 V, power source U2-3 uses TPS767D325.

When operating: the digital memory unit may connect with peripherals. According to operation instructions a unique bundle code is automatically generated for every 100 banknotes. If the banknote robbed, the stolen banknote serial numbers in a certain bundles can be found out from the digital memory unit and published. Terminals of cashiers, which connected with networks of banking industry and mounted with the invention, can instantly detect those stolen banknote. Even the criminals consume in other channels, their traces can be detected according to the robbed banknote emerging frequency in certain regions. So that the robbed money is no longer easy to spend and consequently such robbery crimes become meaningless economically and similar crimes are hopefully rooted out.

By using the gigantic capacity of computers it is possible to store all banknotes in hard disk, or to record all banknote serial numbers deposited in the banks. When the terminals at the bank find banknote serial numbers the same number as the stored the banknote serial numbers may be a counterfeit. Using this method is simpler, more accurate and more powerful strike to money counterfeiting crimes.

Along with computer processing speed increased, the scanner can directly be connected with computers, and the scanned images may be processed by specific software. In addition, the bundle codes can be printed or bar-coded and attached to the bundles.

What is claimed:

1. A banknote serial number processing method comprising:
    a banknote serial number recording step which comprises converting a banknote serial number into an image signal by using an image capture device;
    a banknote serial number recording decoding which comprises processing the banknote serial number image signal by filtration, analogue-digital conversion and synchronizing separation and storing the processed image signal in an image memory unit;
    banknote serial number digital signal processing step, which involves stored image recognition processing, identifying a bundle code and storing the banknote serial number and the bundle code in digital memory;
    a reading step for a banknote serial number to be compared, involving sorting out a corresponding banknote serial number from a bundle code to be compared, then storing the sorted out serial number in a reading-in memory unit;
    a comparison step involving a comparison of the banknote serial number to be compared and a newly recorded banknote serial number comprising comparing the newly recorded banknote serial number with banknote serial numbers in memory in the reading-in memory until a same serial number coincides and activating an alarm relative to a same serial number coinciding, and wherein the banknote serial numbers in memory are for non-counterfeit banknotes obtained unlawfully.

2. The banknote serial number processing method according to the claim 1, further comprising obtaining newly recorded banknote serial numbers by repeating the above steps of recording, decoding, and digital signal processing.

3. The banknote serial number processing method according to the claim 1, further comprising printing out a bundle code and associating the printed out bundle code with a corresponding banknote bundle.

4. A banknote serial number processing device comprising:
    a banknote counting device;
    an image capture unit mounted for image capture of a banknote serial number;
    a banknote serial number recording and comparison unit which comprises a video decoder, an image memory unit, a digital signal processing unit and a digital memory unit, the video decoder collects image signals from said image capture unit and sends output signals to said image memory unit and wherein output signals from the image memory unit are recognized by the digital processing unit; and banknote serial numbers and respective bundle codes associated with said banknote serial numbers are output from the digital processing unit into said digital memory unit and said recording and comparison unit including a comparison device which is designed to compare presently processed banknotes serial numbers relative to legal banknote serial numbers earlier recorded and stored in memory.

5. The device of claim 4, characterized in that the digital signal processing unit sends banknote serial numbers to said comparison device and said digital memory unit includes a read in memory unit that feeds the earlier recorded and stored serial numbers to the comparison device for comparison purposes and triggers a signal if a serial number match occurs.

6. The device of claim 5, wherein the recording and comparison unit has a logic flow procedure which is as follows: starting, formatting, setting a cash note number as zero; reading image from the image memory unit; judging if it is valid image, if not, ending the program; if it is valid image, Gauss filtration, modified projection location and digital mode mask processing are used, the serial numbers are rectified and converted to binary data, and then their structures are identified and output; add one to number of cash note; judging if the cash note reaches a predetermined number, if so, bundle up the banknote and assign a bundle code to the bundle, output the bundle code, reset the cash note number to zero and go back the above steps from the step of reading image from the image memory unit; if the cash note number is not the predetermined number, the system goes directly back to the step of reading image from the image memory unit.

7. The device of claim 5, characterized in that the comparison device includes a logic flow as follows: starting, formatting, setting a cash note number to zero; reading the image from the image memory unit; judging if the image is valid, if not, ending the program; if the image is valid, Gauss filtration, modified projection location and digital mode mask processing are used, the serial numbers are rectified and converted to binary data, and then their structures are identified and sent out and compared with the stored unlawfully obtained banknote serial numbers when same serial number is found, signaling an alarm and ending the program; if there is no same serial number, adding one to cash note number; judging if the cash note number is at a predetermined number, if so, bundling up the banknote and assigning a code to the bundle and output the bundle code; resetting cash note number as zero and going back the above steps from the step of reading image from the image memory unit; if the cash note number is not at the predetermined number, returning directly to the step of reading image from the image memory unit.

8. The device of the claim 4, wherein the only image capture device associated with said banknote serial number processing device is one limited to serial number capture.

9. The device of claim 8, wherein a number of image capture devices are utilized comprising four units, with two set at an entry side of the banknote counting device and the other two at an outgoing side of the banknote counting device.

10. The device of claim 8, wherein there are four image capture devices, two above the banknote counting device between entry side and outgoing side and the other two beneath the banknote counting device between entry side and outgoing side.

11. The device of claim 4, wherein the video decoder has a video pre-processor equipped with a second crystal oscillator, and an input terminal of said video decoder is connected with said image capture unit so as to receive output image signals from said image capture device and the output digital image signals are transmitted to said image memory unit; and wherein a monolithic computer is connected with the video pre-processor for formatting output signals from said video pre-processor, and; the monolithic computer being equipped with a first resetting circuit and a first crystal oscillation circuit.

12. The device of claim 4, the digital signal processing unit comprises a DSP digital signal processor, in which there is an image pre-processing unit, a binary processing unit, and digital recognition unit, and recording and comparison programs together with a clock second resetting circuit, a power source and a simulation interface connected with the digital memory unit via data bus and an address bus.

13. The device of claim 4, wherein the digital memory unit comprises a data memory unit and a program memory unit, which are connected respectively with a DSP digital signal processor.

14. The device of claim 13, wherein the DSP digital signal processor also has an alarm output device and a digital comparison unit.

15. The device of claim 4, further comprising an output device wherein the output device is a display or a computer.

16. The device of claim 4 wherein said comparison unit is a digital comparison unit forming a part of the digital processing unit, and which is arranged such that the digital signal processing unit sends banknote serial number data to said digital memory unit only after comparison of that banknote serial number data by the comparison unit.

17. A banknote serial number processing method, comprising:
a banknote serial number recording step wherein a stack of to-be-newly recorded banknotes, which have images of serial numbers associated with said to-be-newly recorded banknotes, are subjected to image recognition, wherein the image recognition includes image recognition of serial numbers of the to-be-newly recorded banknotes;
a conversion step comprising a conversion of image recognition serial numbers to digital data inclusive of digital serial number data and bundle codes respectively assigned to each of a plurality of sub-groups of converted image recognized serial numbers;
a comparison step which includes a comparing of digital data from said conversion step to provided serial number data, with said provided serial number data being derived from a database containing serial number data of non-counterfeit banknotes which represent banknotes unlawfully obtained by a third party.

18. The method as recited in claim 17, further comprising an alarm step which involves triggering an alarm when the comparison step locates serial number data in said database that matches serial number data of one of the to-be-newly recorded banknotes.

19. The method as recited in claim 17, further comprising a memory storage step involving recording of digital serial number data and respective bundle codes for each sub-group of converted image recognized serial numbers that is not found to have a corresponding serial number in the comparison step.

20. The method as recited in claim 17, wherein the provided serial number data is input to a read in memory unit in digital data form with the digital data comprising digital serial number data and bundle codes relative to an earlier recordation of the digital serial number data and bundle codes of the banknotes unlawfully obtained by a third party.

21. The method as recited in claim 20, further comprising a memory storage step involving recording of digital serial number data and respective bundle codes for each sub-group of converted image recognized serial numbers that is not found to have a corresponding serial number in the comparison step, and wherein said recorded data is stored in a different memory unit as that in which there is stored the provided serial number data derived from the database containing serial number data of the non-counterfeit banknotes which represent banknotes unlawfully obtained by a third party.

22. The method as recited in claim 21, wherein the memory unit in which there is stored serial number data of the non-counterfeit banknotes which represent banknotes unlawfully obtained by a third party is a read-in memory unit and the stored serial number data of the non-counterfeit banknotes which represent banknotes unlawfully obtained by a third party are stored in sequence based on previously obtained bundle code sub-groupings for comparison with individual serial number being derived during the conversion step associated with the to-be-newly recorded banknotes.

23. The method as recited in claim 21, further comprising outputting the stored digital data stored in said memory storage step for use as the serial number data of non-counterfeit banknotes which represent banknotes unlawfully obtained by a third party in a subsequently conducted processing of a new set of to-be-newly recorded banknotes.

24. The method as recited in claim 17, wherein the serial number data of non-counterfeit banknotes which represent banknotes unlawfully obtained by a third party is derived from banknotes obtained in a robbery.

25. The method as recited in claim 17, wherein the serial number data of non-counterfeit banknotes which represent banknotes unlawfully obtained by a third party is derived from banknotes obtained in an extortion or kidnapping demand.

26. The method as recited in claim 17, wherein upon the comparison step determining that a matching serial number exists information is sent to an authority responsible for investigating the unlawfully obtained banknotes.

* * * * *